Dec. 21, 1965 R. LEE 3,225,235
DYNAMO-ELECTRIC MACHINE STATOR STRUCTURE
Filed Sept. 29, 1961
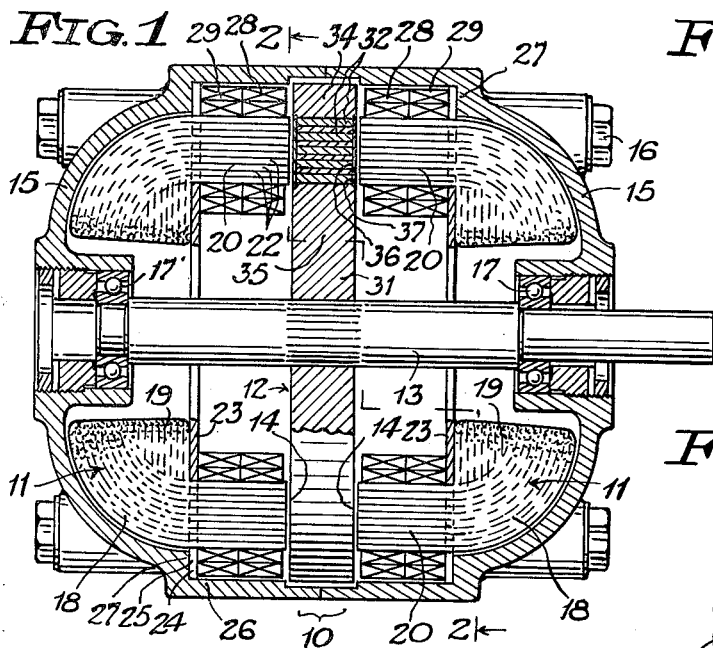
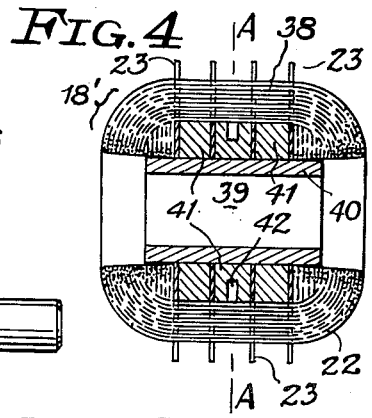
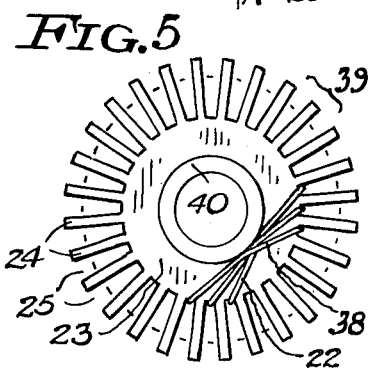
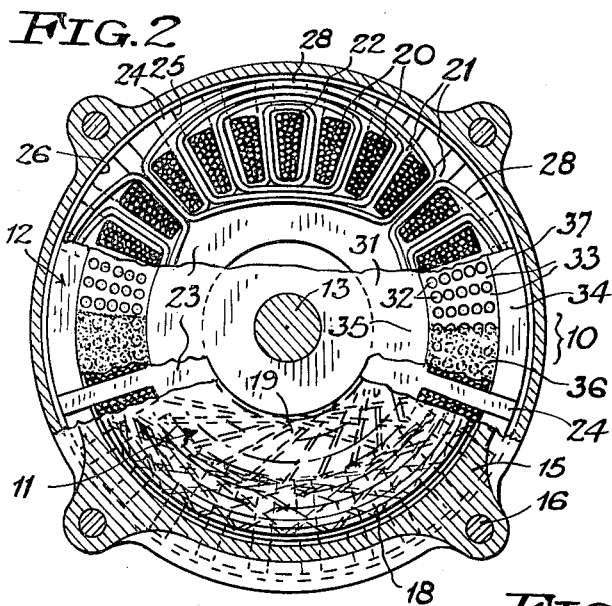
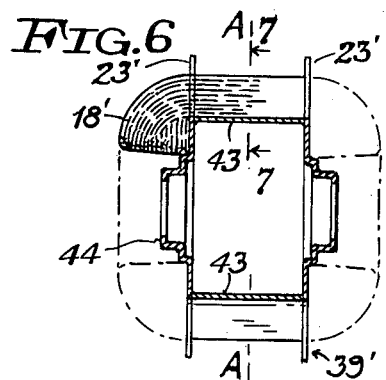
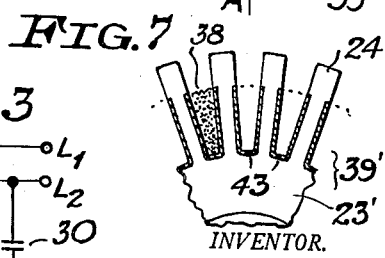
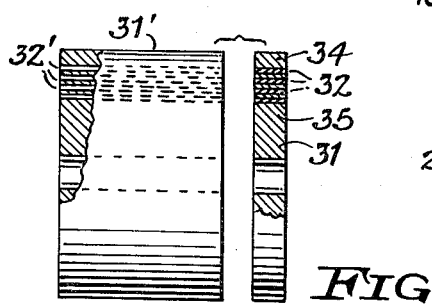
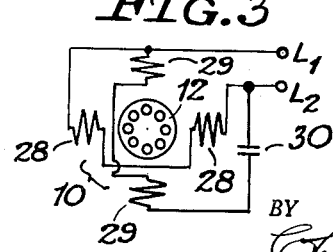
INVENTOR.
ROYAL LEE
BY Christopher L. Neal
ATTORNEY ID # United States Patent Office 3,225,235
Patented Dec. 21, 1965

3,225,235
DYNAMO-ELECTRIC MACHINE STATOR
STRUCTURE
Royal Lee, Box 267, Elm Grove, Wis.
Filed Sept. 29, 1961, Ser. No. 141,693
2 Claims. (Cl. 310—268)

This invention relates to electromagnetic apparatus and more particularly to dynamo-electric machines of the axial air-gap type.

An object of the invention is to provide a simple, inexpensive and efficient axial air-gap electrical machine, such as an induction motor.

Another object of the invention is to provide an axial air-gap machine having an improved stator core made of iron wire and so arranged as to reduce core losses and to facilitate fabrication.

The invention further consists in the several features hereinafter described and claimed.

In the accompanying drawing,

FIG. 1 is a longitudinal sectional elevation of an axial air-gap induction motor constructed in accordance with the invention;

FIG. 2 is a transverse sectional view taken generally on the line 2—2 of FIG. 1;

FIG. 3 is a view showing a form of wiring diagram for the motor;

FIG. 4 is a longitudinal sectional view showing an iron wire stator core assembly or stator block before it is severed to form two complementary stator core sections;

FIG. 5 is an end view of the stator core assembly with the iron wire thereof in partially wound condition;

FIG. 6 is a longitudinal sectional view of a modified form of stator core winding support;

FIG. 7 is a fragmentary transverse sectional view taken generally on the line 7—7 of FIG. 6, and FIG. 8 is a side view, partly in section, of a composite rotor body blank and rotor disk severed therefrom.

In the drawing, there is shown a dynamo-electric machine 10 in the form of an induction motor constructed in accordance with the invention. The motor comprises a pair of axially spaced axial-pole stator elements 11 and an intervening squirrel-cage disk rotor 12 rigidly mounted on a shaft 13, the stator elements and rotor being hereinafter more fully described. The rotor is separated from the spaced stator elements by two axial air-gaps 14 at opposite sides of the rotor, the air-gaps extending in parallel planes normal to the axis of rotation of the rotor, so that stator flux will pass axially from one stator element to the other through the intervening disk rotor and air-gaps.

The two coaxial stator elements 11 are rigidly mounted in opposed axially spaced relation in a motor housing or frame comprising a pair of end bells 15 connected by bolts 16. The rotor shaft 13 is journalled in ball-bearings 17 here shown to be carried in the end bells.

Each of the stator elements is of anular shape and includes an annular magnetizable core 18 comprising an annular yoke portion 19 provided with a crown of equiangularly spaced axially extending pole pieces or teeth 20 of wedge-shaped cross-section forming intervening parallel-sided radial slots 21, FIG. 2, the corresponding teeth of the two stator cores preferably being in axial alignment. The stator cores are constructed largely or entirely of soft or annealed iron wire 22, as hereinafter described, portions of the iron wire being bundled and bonded together and extending axially to form the pole pieces. Each stator core is here shown to include a disk-like spider 23 with radial teeth 24 and intervening slots 25, the spider being disposed at the base of the axially extending pole pieces. The outer ends of the spider teeth fit in a circular rabbet 26 formed in the associated end bell, the rabbet including a flat annular shoulder 27 against which the teeth laterally bear. Each stator core is suitably secured in the end bell, as by cementing with insulating varnish. The spider 23 is desirably in the form of a thin annular disk of magnetizable material, such as soft sheet iron, which carries a part of the stator flux. The surfaces of the iron wire and disk are suitably insulated, as by thin oxide coatings or varnish. The permeability of the iron wire is relatively high in the direction of its length. In some instances, the spiders 23 may be made of insulating material.

Suitable field or primary windings 28 and 29 are disposed on the stator core pole pieces and by way of example are here shown to be of the four-pole concentric type. If desired, the windings may be formed of spirally wound insulated copper tape. The primary winding 28 is connected directly across line terminals $L_1$, $L_2$, FIG. 3, while the primary winding 29 is angularly spaced, such as at 90° electrical degrees, from the field winding 28 and is connected to the line terminals through a phase-shifting element, such as a capacitor 30. Desirably, each primary winding has sections wound in registering aiding relation on both stator cores, although in some instances one winding may be carried wholly on one stator core, and the other winding may be carried wholly on the other stator core. The stator windings may also be of the three-phase type.

The squirrel-cage disk rotor 12, which is formed as hereinafter described, comprises a centrally apertured disk 31 of non-magnetic metal of relatively good electrical conductivity, such as copper or aluminum, and is interposed between the stator core sections, being spaced slightly from the pole faces of the stator pole pieces to form the two axial air-gaps 14. Embedded in the rotor disk in an annular region or zone between the stator poles are numerous axially disposed magnetizable rods 32, such as of soft iron, which extend substantially to the opposite faces of the disk. The rods 32 are of small diameter, for example ⅛″ to 3/16″, and are preferably arranged in rows which extend generally radially of the disk, leaving intervening conductor bar portions 33 which extend in a generally radial direction and connect the outer and inner annular portions of the disk, these annular portions forming end rings 34 and 35. In some instances, the opposite faces of the disks have bonded thereto thin annular layers 36 of magnetizable material, such as iron cement, to form flux distributors at the opposite ends of the iron rods 32 embedded in the disk. The iron cement layers are preferably disposed in flat shallow annular recesses 37 formed in the opposite faces of the disk. The maximum permeability of the iron rods is oriented lengthwise of the rods.

The two stator cores are severed from a generally cylindrical stator block 18' of tubular shape, FIG. 4, which comprises a winding 38 of the iron wire 22, the winding somewhat resembling a drum-type armature winding. The iron wire winding is wound on a supporting form 39 which comprises two or more of the disc-like spiders 23 disposed in spaced coaxial relation and carried on a sleeve 40, the spiders being spaced by rings 41 the middle one of which has a peripheral groove 42 to clear a saw or other suitable cutting tool, not shown.

In a preferred method of winding the iron core wire, the wire is laid in an axially extending slot of the supporting form and is then passed over an end of the form and laid in another slot distant therefrom, FIG. 5, as in a progressive lap-type drum armature winding. In the case of the four-pole machine illustrated, the span of the winding is approximately 90°, as shown in FIG. 5, while in the case of a two-pole machine, the winding span is approximately 180°. The next turn of wire is laid in a slot adjacent to the first-named slot, passed over an end of the form and then laid in a slot adjacent to the second-named slot. The winding is then continued until there is a turn in each slot of a quadrant (or in all the slots in the case of a two-pole full-span winding), and additional turns are then laid in the slots in a similar manner until all the slots are filled. The completed iron wire winding assembly 38 is of tubular shape and presents a substantially symmetrical appearance when viewed from the end. After the iron wire winding is applied to the form and suitably bonded, as by insulating varnish, the axially extending bundled portions of the winding are severed on the midline A—A of FIG. 4, and the two core-forming halves of the winding are removed from the form, except that the end disks or spiders 23 preferably remain in the respective core halves or sections. In some instances, the stator block is frozen in ice before severance, so as to avoid softening of the cement and to facilitate maintaining the shape of the pole pieces.

Instead of severing the stator block on the midline A—A of FIG. 4, it is possible to sever the block closer to one of the end disks, so that one of the two severed core sections will have shorter pole pieces than the other. In this case, the shorter core section may or may not be provided with a winding. Another method, which is less desirable, consists in providing a somewhat shorter stator block and severing the block quite close to an end disk, the toothless short core section being discarded.

In the modified type of winding form 39' shown in FIGS. 6 and 7, two annular magnetizable end disks or spiders 23' are connected by axially extending magnetizable channel members 43 of thin sheet iron, as by means of welding, and after the iron wire core winding 38 is applied to the form, the assembly is severed on the midline A—A of FIG. 6 to provide two stator core sections, each section including an end disk and the attached halves of the channel members, the latter then forming the side walls of the pole pieces. Each end disk is here shown to have a cupped central portion 44 to receive a shaft bearing, not shown.

The rotor disk 31 is of cast construction, the iron rods 32 being axially embedded therein during the casting operation. A preferred method of making the rotor disks is illustrated in FIG. 8, and comprises casting a cylindrical body 31' of copper or aluminum about numerous axially extending iron rods 32' arranged in an annular array, the casting being preferably effected in a vertical mold cavity. Several rotor disks are then severed from the composite body or blank by a suitable cutting tool. Each rotor disk may be used as such or it may be further processed by cutting the shallow annular recesses 37 shown in FIG. 1 in the opposite faces of the disk, and then filling in the recesses with iron cement.

In the operation of the induction motor of FIGS. 1 to 3, alternating magnetic flux passes axially from the pole pieces or teeth 20 of one stator core straight through the disk rotor 12 by way of the embedded rotor core bars or rods 32 to the pole pieces or teeth of the other stator core and then in a circumferential direction along the mass of iron wire forming the yoke or back portion of the second stator core, returning axially through the rotor to the pole pieces and annular yoke of the first stator core. The rotating magnetic field induces alternating voltages in the squirrel-cage disk rotor, causing rotor currents to flow which react with the axially extending field flux to exert a torque on the rotor. The axial thrust on the rotor is small or negligible, so that the rotor bearings are not required to resist any appreciable axial load. The motor starts easily, even under a considerable load, and runs smoothly and quietly.

The desired rotor resistance can be obtained by selecting the thickness of the rotor disk, the axial positions of the stator elements being adjusted, as by suitably dimensioned end bells, or by suitable spacer rings, not shown, in the rabbets 26, to provide the proper air-gaps.

Each stator core section of the motor comprises numerous U-shaped lengths of iron wire, produced by severance of the iron wire winding forming the stator core block. The opposite bundled ends of a group of the U-shaped wire lengths form pole pieces which are spaced approximately a pole pitch apart, thus providing a suitable flux path for the stator flux.

I claim:

1. A stator core block for use in making dynamo-electric machine stator cores with axially extending peripherally spaced pole pieces, comprising a winding form including a pair of axially spaced end plates and a circular series of outwardly opening, angularly spaced, axially extending channel members secured at their opposite ends to the respective end plates, and a drum-type iron wire core winding carried by said form and including bundled wire parts extending longitudinally in said channel members, said core block being severable in a plane normal to the block axis and intersecting said channel members, the opposite side walls of said channels confining and shaping the iron wire bundles therein.

2. A stator core block for use in making dynamo-electric machine stator cores with axially extending peripherally spaced pole pieces, comprising a winding form including a pair of axially spaced radially slotted annular end plates and a circular series of outwardly opening, angularly spaced, axially extending channel members secured at their opposite ends to the respective end plates, said end plates having respective central bearing-receiving recesses, and a drum-type iron wire core winding carried by said form and including bundled wire parts extending longitudinally in said channel members, the opposite side walls of said channel members confining and shaping the iron wire bundles therein, said core block being severable in a plane normal to the block axis and intersecting said channel members.

References Cited by the Examiner
UNITED STATES PATENTS

| 1,121,859 | 12/1914 | Messiter | 29—155.61 X |
| 1,497,469 | 6/1924 | Ames | 29—155.61 X |
| 1,910,227 | 5/1933 | Austin | 29—155.58 |
| 2,479,589 | 8/1949 | Parker | 310—211 |
| 2,490,021 | 12/1949 | Aske | 310—268 X |
| 2,550,571 | 4/1951 | Litman | 310—268 |
| 2,557,249 | 6/1951 | Aske | 310—268 |
| 2,709,762 | 5/1955 | Naul | 310—259 |
| 2,718,049 | 9/1955 | Parche | 29—155.61 |
| 2,897,387 | 7/1959 | Welter | 310—268 |
| 2,951,569 | 9/1960 | Tompkins et al. | 310—268 X |
| 2,956,189 | 10/1960 | Buss et al. | 310—211 |
| 2,958,057 | 10/1960 | Berman | 29—155.56 X |
| 2,977,491 | 3/1961 | Hueffed et al. | 310—259 |

FOREIGN PATENTS 619,481    3/1949    Great Britain.

ORIS L. RADER, *Primary Examiner.*

MILTON O. HIRSHFIELD, DAVID X. SLINEY,
*Examiners.*

P. L. McBRIDE, J. J. SWARTZ, *Assistant Examiners.*